(12) United States Patent  (10) Patent No.: US 9,790,289 B1
Ma et al.  (45) Date of Patent: Oct. 17, 2017

(54) FUNCTIONALIZED POLYMER, RUBBER COMPOSITION, AND PNEUMATIC TIRE

(71) Applicant: The Goodyear Tire & Rubber Company, Akron, OH (US)

(72) Inventors: Liqing Ma, Uniontown, OH (US); Margaret McGuigen Vielhaber, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/251,624

(22) Filed: Aug. 30, 2016

(51) Int. Cl.
*C08C 19/25* (2006.01)
*C08K 3/36* (2006.01)

(52) U.S. Cl.
CPC .............. *C08C 19/25* (2013.01); *C08K 3/36* (2013.01)

(58) Field of Classification Search
CPC .................................. C08K 2/36; C08C 19/25
(Continued)

(56) References Cited

U.S. PATENT DOCUMENTS 5,395,891 A 3/1995 Obrecht
5,672,639 A 9/1997 Corvasce
(Continued)

*Primary Examiner* — Kelechi Egwim
(74) *Attorney, Agent, or Firm* — John D. DeLong

(57) ABSTRACT

The present invention is directed to a functionalized elastomer comprising the reaction product of a living elastomeric polymer and a polymerization terminator of formula I, wherein the functionalized elastomer comprises repeat units of a diene monomer and optionally a vinyl aromatic monomer, and the functionalized elastomer comprises at least 92 percent by weight of cis 1,4 microstructure content based on the weight of the polydiene content of the functionalized elastomer

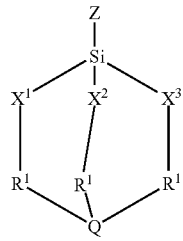
(I)

wherein $R^1$ is C1 to C4 linear alkyl, or C1 to C4 branched alkanediyl; $X^1, X^2, X^3$ are independently O, S, or a group of formula (II) or (III)

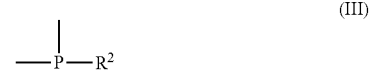

(III)

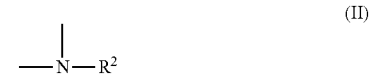

(II)

where $R^2$ is C1 to C18 linear or branched alkyl; Z is $R^3$, $-OR^4$, or $-R^5-X^4$; $R^3, R^4$ are independently C1 to C18 linear or branched alkyl; $R^5$ is C1 to C18 alkanediyl or dialkyl ether diyl; $X^4$ is halogen or a group of structure IV, V, VI, VII or VIII

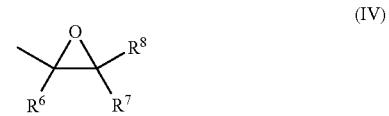
(IV)

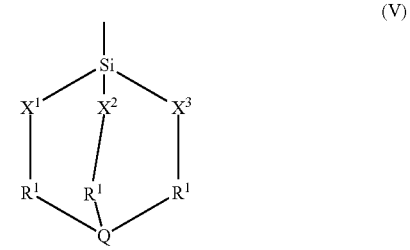

(V)

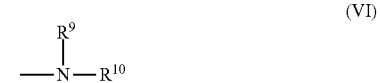

(VI)

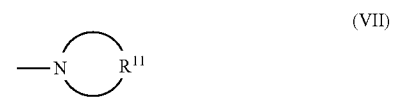

(VII)

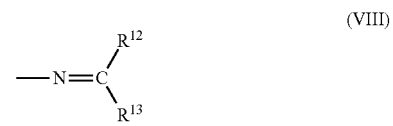

(VIII)

wherein $R^6, R^7, R^8, R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl;

(Continued)

Q is N or a group of structure IX

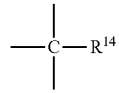
(IX)

wherein $R^{14}$ is C1 to C8 alk.

18 Claims, 3 Drawing Sheets

(58) Field of Classification Search
USPC .................................................. 524/572
See application file for complete search history.

(56) References Cited

U.S. PATENT DOCUMENTS

| | | |
|---|---|---|
| 6,127,488 A | 10/2000 | Obrecht |
| 6,133,364 A | 10/2000 | Obrecht |
| 6,207,757 B1 | 3/2001 | Obrecht |
| 6,242,534 B1 | 6/2001 | Obrecht |
| 6,372,857 B1 | 4/2002 | Obrecht |
| 6,608,125 B2 | 8/2003 | Cruse |
| 7,202,306 B2 | 4/2007 | Tanaka |
| 7,750,087 B2 | 7/2010 | Ozawa |
| 8,598,286 B1 | 12/2013 | Flook |
| 8,816,032 B1 | 8/2014 | Flook |
| 9,090,730 B1 | 7/2015 | Mazumdar |
| 9,109,073 B1 | 8/2015 | Ma |
| 9,109,103 B2 | 8/2015 | Ma |
| 2003/0130535 A1 | 7/2003 | Deschler |
| 2015/0148479 A1* | 5/2015 | Ma .................. B60C 1/00 524/575 |
| 2016/0053077 A1 | 2/2016 | Ma |

* cited by examiner

FUNCTIONALIZED POLYMER, RUBBER COMPOSITION, AND PNEUMATIC TIRE

BACKGROUND OF THE INVENTION

In recent years, there is a growing demand for functionalized polymers. Functionalized polymers can be synthesized through various polymerization techniques.

Polymers made via Ziegler-Natta catalysis show a high degree of stereospecificity; in the case of diene based elastomers a high degree of cis 1,4 insertion of the diene is observed. Functionalization of such elastomers may be obtained via in chain polymerization of functionalized monomers, or termination with functionalized terminators.

This invention details synthesis of functionalized polymers and their use in rubber formulation and tire materials. In general to achieve the best tire performance properties functionalized polymers are highly desirable. In order to reduce the rolling resistance and to improve the tread wear characteristics of tires, functionalized elastomers having a high rebound physical property (low hysteresis) have been used for the tire tread rubber compositions. However, in order to increase the wet skid resistance of a tire tread, rubbery polymers that have a relatively lower rebound physical property (higher hysteresis) which thereby undergo a greater energy loss, have sometimes been used for such tread rubber compositions. To achieve such relatively inconsistent viscoelastic properties for the tire tread rubber compositions, blends (mixtures) of various types of synthetic and natural rubber can be utilized in tire treads.

Functionalized rubbery polymers made by living polymerization techniques are typically compounded with sulfur, accelerators, antidegradants, a filler, such as carbon black, silica or starch, and other desired rubber chemicals and are then subsequently vulcanized or cured into the form of a useful article, such as a tire or a power transmission belt. It has been established that the physical properties of such cured rubbers depend upon the degree to which the filler is homogeneously dispersed throughout the rubber. This is in turn related to the level of affinity that filler has for the particular rubbery polymer. This can be of practical importance in improving the physical characteristics of rubber articles which are made utilizing such rubber compositions. For example, the rolling resistance and traction characteristics of tires can be improved by improving the affinity of carbon black and/or silica to the rubbery polymer utilized therein. Therefore, it would be highly desirable to improve the affinity of a given rubbery polymer for fillers, such as carbon black and silica.

In tire tread formulations, better interaction between the filler and the rubbery polymer results in lower hysteresis and consequently tires made with such rubber formulations have lower rolling resistance. Low tan delta values at 60° C. are indicative of low hysteresis and consequently tires made utilizing such rubber formulations with low tan delta values at 60° C. normally exhibit lower rolling resistance. Better interaction between the filler and the rubbery polymer in tire tread formulations also typically results higher tan delta values at 0° C. which is indicative of better traction characteristics.

SUMMARY OF THE INVENTION

The subject invention provides a low cost means for the end-group functionalization of rubbery living polymers to improve their affinity for fillers, such as carbon black and/or silica. Such functionalized polymers can be beneficially used in manufacturing tires and other rubber products where improved polymer/filler interaction is desirable. In tire tread compounds this can result in lower polymer hysteresis which in turn can provide a lower level of tire rolling resistance.

The present invention is directed to a functionalized elastomer comprising the reaction product of a living elastomeric polymer and a polymerization terminator of formula I, wherein the functionalized elastomer comprises repeat units of a diene monomer and optionally a vinyl aromatic monomer, and the functionalized elastomer comprises at least 92 percent by weight of cis 1,4 microstructure content based on the weight of the polydiene content of the functionalized elastomer

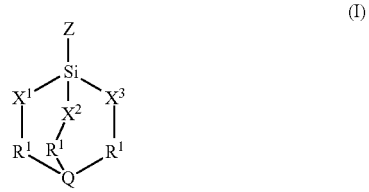

wherein $R^1$ is C1 to C4 linear alkyl, or C1 to C4 branched alkanediyl; $X^1$, $X^2$, $X^3$ are independently O, S, or a group of formula (II) or (III)

where $R^2$ is C1 to C18 linear or branched alkyl; Z is $R^3$, $-OR^4$, or $-R^5-X^4$; $R^3$, $R^4$ are independently C1 to C18 linear or branched alkyl; $R^5$ is C1 to C18 alkanediyl or dialkyl ether diyl; $X^4$ is halogen or a group of structure IV, V, VI, VII or VIII

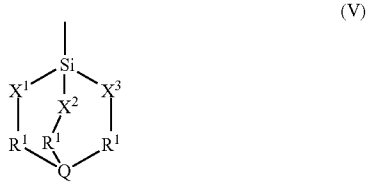

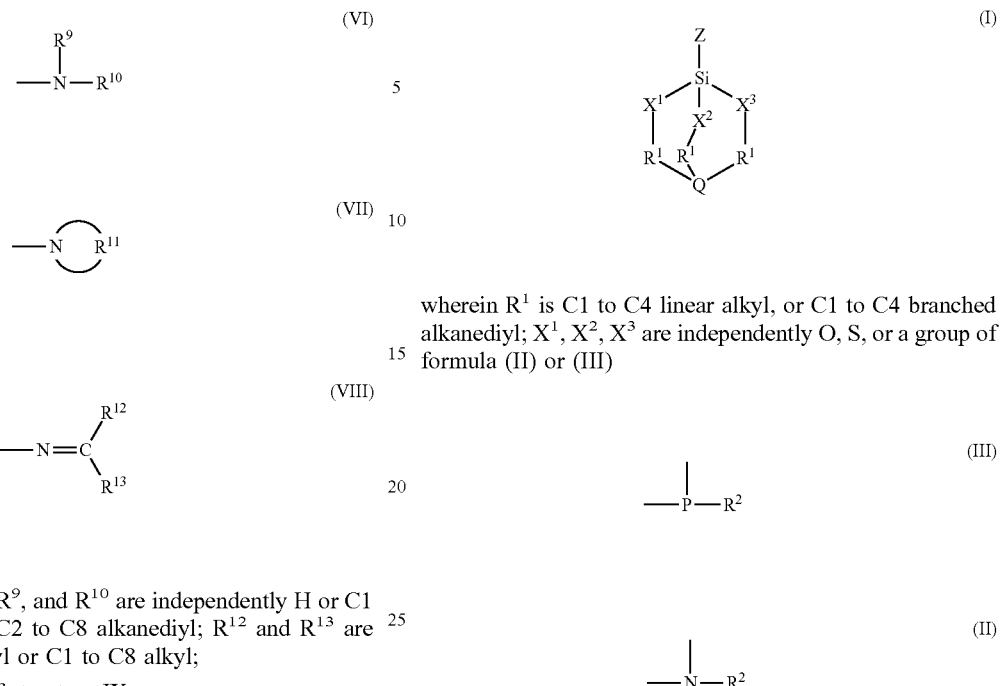

wherein $R^1$ is C1 to C4 linear alkyl, or C1 to C4 branched alkanediyl; $X^1$, $X^2$, $X^3$ are independently O, S, or a group of formula (II) or (III)

where $R^2$ is C1 to C18 linear or branched alkyl; Z is $R^3$, —$OR^4$, or —$R^5$—$X^4$; $R^3$, $R^4$ are independently C1 to C18 linear or branched alkyl; $R^5$ is C1 to C18 alkanediyl or dialkyl ether diyl; $X^4$ is halogen or a group of structure IV, V, VI, VII or VIII

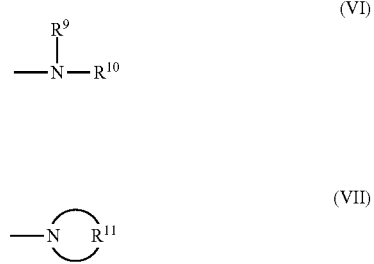

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl;

Q is N or a group of structure IX wherein $R^{14}$ is C1 to C8 alkyl.

The invention is further directed to a method of making the functionalized elastomer.

The invention is further directed to a rubber composition comprising the functionalized elastomer, and a pneumatic tire comprising the rubber composition.

DETAILED DESCRIPTION OF THE INVENTION

Figure 1:
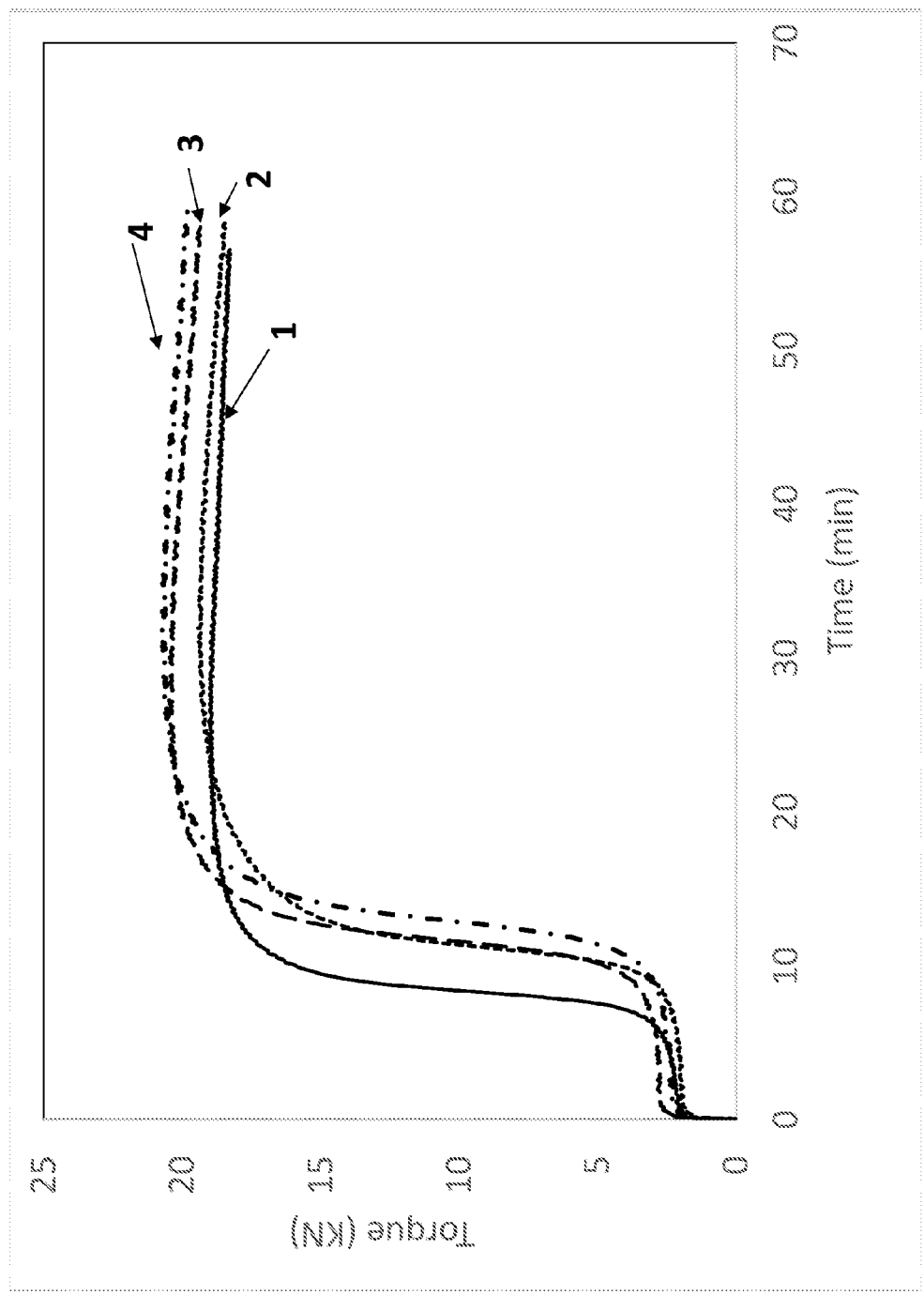
FIG. 1 shows a graph of torque versus cure time for several rubber samples.

There is disclosed A functionalized elastomer comprising the reaction product of a living elastomeric polymer and a polymerization terminator of formula I, wherein the functionalized elastomer comprises repeat units of a diene monomer and optionally a vinyl aromatic monomer, and the functionalized elastomer comprises at least 92 percent by weight of cis 1,4 microstructure content based on the weight of the polydiene content of the functionalized elastomer

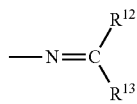

(VIII)

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl;
Q is N or a group of structure IX

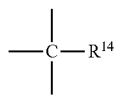

(IX)

wherein $R^{14}$ is C1 to C8 alkyl.

There is further disclosed a method of making the functionalized elastomer.

There is further disclosed a rubber composition comprising the functionalized elastomer, and a pneumatic tire comprising the rubber composition.

The functionalized elastomer of this invention are made via solution polymerization in the presence of a lanthanide-based polymerization catalyst. Suitable catalyst may include lanthanide catalysts based on cerium, praseodymium, neodymium, or gadolinium. In one embodiment, the lanthanide-based polymerization catalyst is neodymium catalyst system. Such polymerizations are typically conducted in a hydrocarbon solvent that can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

The neodymium catalyst system used in the process of this invention is made by preforming three catalyst components. These components are (1) an organoaluminum compound, (2) a neodymium carboxylate, and (3) a dialkyl aluminum chloride. In making the neodymium catalyst system the neodymium carboxylate and the organoaluminum compound are first reacted together for 10 minutes to 30 minutes in the presence of isoprene to produce a neodymium-aluminum catalyst component. The neodymium carboxylate and the organoaluminum compound are preferable reacted for 12 minutes to 30 minutes and are more preferable reacted for 15 to 25 minutes in producing the neodymium-aluminum catalyst component.

The neodymium-aluminum catalyst component is then reacted with the dialkyl aluminum chloride for a period of at least 30 minutes to produce the neodymium catalyst system. The activity of the neodymium catalyst system normally improves as the time allowed for this step is increased up to about 24 hours. Greater catalyst activity is not normally attained by increasing the aging time over 24 hours. However, the catalyst system can be aged for much longer time periods before being used without any detrimental results.

The neodymium catalyst system will typically be preformed at a temperature that is within the range of about 0° C. to about 100° C. The neodymium catalyst system will more typically be prepared at a temperature that is within the range of about 10° C. to about 60° C. The neodymium catalyst system will preferably be prepared at a temperature that is within the range of about 15° C. to about 30° C.

The organoaluminum compound contains at least one carbon to aluminum bond and can be represented by the structural formula:

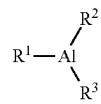

in which $R^1$ is selected from the group consisting of alkyl (including cycloalkyl), alkoxy, aryl, alkaryl, arylalkyl radicals and hydrogen: $R^2$ is selected from the group consisting of alkyl (including cycloalkyl), aryl, alkaryl, arylalkyl radicals and hydrogen and $R^3$ is selected from a group consisting of alkyl (including cycloalkyl), aryl, alkaryl and arylalkyl radicals. Representative of the compounds corresponding to this definition are: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-propylaluminum, triisopropylaluminim, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

The neodymium carboxylate utilizes an organic monocarboxylic acid ligand that contains from 1 to 20 carbon atoms, such as acetic acid, propionic acid, valeric acid, hexanoic acid, 2-ethylhexanoic acid, neodecanoic acid, lauric acid, stearic acid and the like neodymium naphthenate, neodymium neodecanoate, neodymium octanoate, and other neodymium metal complexes with carboxylic acid containing ligands containing from 1 to 20 carbon atoms.

The proportions of the catalyst components utilized in making the neodymium catalyst system of this invention can be varied widely. The atomic ratio of the halide ion to the neodymium metal can vary from about 0.1/1 to about 6/1. A more preferred ratio is from about 0.5/1 to about 3.5/1 and the most preferred ratio is about 2/1. The molar ratio of the trialkylaluminum or alkylaluminum hydride to neodymium metal can range from about 4/1 to about 200/1 with the most preferred range being from about 8/1 to about 100/1. The molar ratio of isoprene to neodymium metal can range from about 0.2/1 to 3000/1 with the most preferred range being from about 5/1 to about 500/1.

The amount of catalyst used to initiate the polymerization can be varied over a wide range. Low concentrations of the catalyst system are normally desirable in order to minimize ash problems. It has been found that polymerizations will occur when the catalyst level of the neodymium metal varies between 0.05 and 1.0 millimole of neodymium metal per 100 grams of monomer. A preferred ratio is between 0.1 and 0.3 millimole of neodymium metal per 100 grams of monomer.

The concentration of the total catalyst system employed of course, depends upon factors such as purity of the system, polymerization rate desired, temperature and other factors. Therefore, specific concentrations cannot be set forth except to say that catalytic amounts are used.

Temperatures at which the polymerization reaction is carried out can be varied over a wide range. Usually the temperature can be varied from extremely low temperatures such as −60° C. up to high temperatures, such as 150° C. or higher. Thus, the temperature is not a critical factor of the invention. It is generally preferred, however, to conduct the reaction at a temperature in the range of from about 10° C. to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

Many types of unsaturated monomers which contain carbon-carbon double bonds can be polymerized into polymers using such metal catalysts. Elastomeric or rubbery polymers can be synthesized by polymerizing diene monomers utilizing this type of metal initiator system. The diene monomers that can be polymerized into synthetic rubbery polymers can be either conjugated or nonconjugated diolefins. Conjugated diolefin monomers containing from 4 to 8 carbon atoms are generally preferred. Vinyl-substituted aromatic monomers can also be copolymerized with one or more diene monomers into rubbery polymers, for example styrene-butadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, α-methylstyrene, and the like.

The rubbery polymers that are functionalized with a terminator of formula I in accordance with this invention are generally prepared by solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

The metal terminated living rubbery polymers utilized in the practice of this invention can be of virtually any molecular weight. However, the number average molecular weight of the living rubbery polymer will typically be within the range of about 50,000 to about 500,000. It is more typical for such living rubbery polymers to have number average molecular weights within the range of 100,000 to 250,000.

The metal terminated living rubbery polymer can be functionalized by simply adding a stoichiometric amount of a terminator of formula I to a solution of the rubbery polymer (a rubber cement of the living polymer). In other words, approximately one mole of the terminator of formula I is added per mole of terminal metal groups in the living rubbery polymer. The number of moles of metal end groups in such polymers is assumed to be the number of moles of the metal utilized in the initiator. It is, of course, possible to add greater than a stoichiometric amount of the terminator of formula I. However, the utilization of greater amounts is not beneficial to final polymer properties. Nevertheless, in many cases it will be desirable to utilize a slight excess of the terminator of formula I to insure that at least a stoichiometric amount is actually employed or to control the stoichiometry of the functionalization reaction. In most cases from about 0.8 to about 1.1 moles of the terminator of formula I will be utilized per mole of metal end groups in the living polymer being treated. In the event that it is not desired to functionalize all of the metal terminated chain ends in a rubbery polymer then, of course, lesser amounts of the terminator of formula I can be utilized.

The terminator of formula I will react with the metal terminated living rubbery polymer over a very wide temperature range. For practical reasons the functionalization of such living rubbery polymers will normally be carried out at a temperature within the range of 0° C. to 150° C. In order to increase reaction rates, in most cases it will be preferred to utilize a temperature within the range of 20° C. to 100° C. with temperatures within the range of 50° C. to 80° C. being most preferred. The capping reaction is very rapid and only very short reaction times within the range of 0.5 to 4 hours are normally required. However, in some cases reaction times of up to about 24 hours may be employed to insure maximum conversions.

In one embodiment, the terminator of formula I has one of the structures shown in Table 1.

After the functionalization reaction is completed, it will normally be desirable to "kill" any living polydiene chains which remain. This can be accomplished by adding an alcohol, such as methanol or ethanol, to the polymer cement after the functionalization reaction is completed in order to eliminate any living polymer that was not consumed by the reaction with the terminator of formula I. The end-group functionalized polydiene rubber can then be recovered from the solution utilizing standard techniques.

TABLE 1
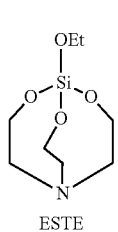  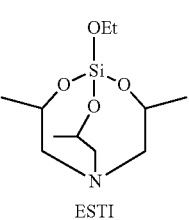  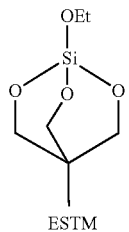
ESTE           ESTI            ESTM
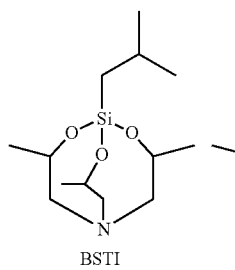  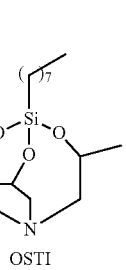
BSTI           OSTI
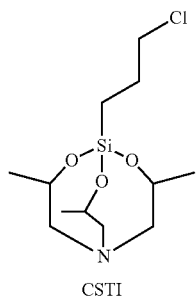  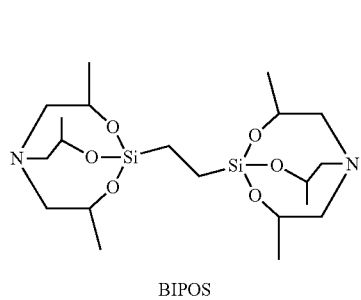
CSTI           BIPOS
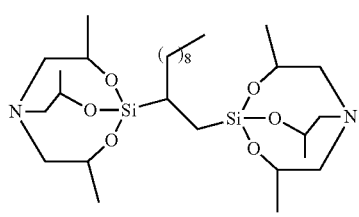
BIDECS
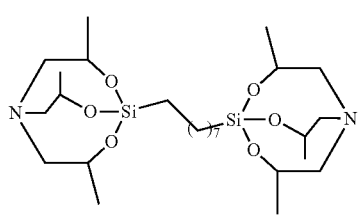
BIOCTS
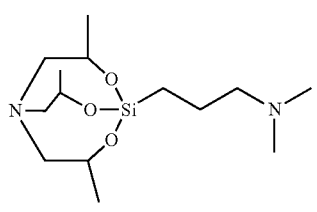
DMASTI

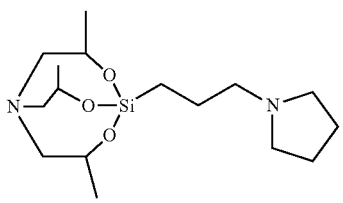

PYSTI

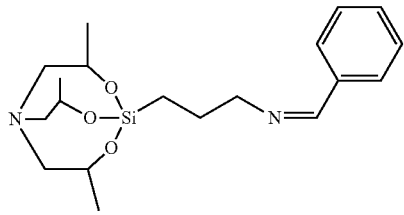

BIMSTI

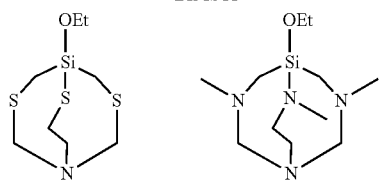

ETTS     ETAS

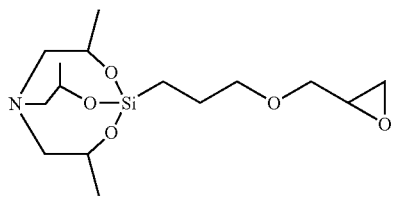

EPTI

| | |
|---|---|
| ESTE: | 1-ethoxy-2,8,9-trioxa-5-aza-1-silabicyclo[3.3.3]undecane, or ethoxysilatrane |
| ESTI: | 1-ethoxy-3,7,10-trimethyl-2,8,9-trioxa-5-aza-1-silabicyclo[3.3.3]undecane, or 1-ethoxy-3,7,10-trimethylsilatrane |
| ESTM: | 1-ethoxy-4-methyl-2,6,7-trioxa-1-silabicyclo[2.2.2]octane |
| BSTI: | 1-isobutyl-3,7,10-trimethyl-2,8,9-trioxa-5-aza-1-silabicyclo[3.3.3]undecane, or 1-isobutyl-3,7,10-trimethylsilatrane |
| OSTI: | 1-octyl-3,7,10-trimethyl-2,8,9-trioxa-5-aza-1-silabicyclo[3.3.3]undecane, or 1-octyl-3,7, 10-trimethylsilatrane |
| CSTI: | 1-(3-chloropropyl)-3,7,10-trimethyl-2,8,9-trioxa-5-aza-1-silabicyclo[3.3.3]undecane, or 1-(3-chloropropyl)-3,7,10-trimethylsilatrane |
| BIPOS: | 1,2-bis(3,7,10-trimethyl-2,8,9-trioxa-5-aza-1-silabicyclo[3.3.3]undecan-1-yl)ethane, or 1,2-bis(3,7,10-trimethylsilatrane)ethane |
| BIDECS: | 1,1'-(decane-1,2-diyl)bis(3,7,10-trimethyl-2,8,9-trioxa-5-aza-1-silabicyclo[3.3.3]undecane), or 1,1'-(decane-1,2-diyl)bis(3,7,10-trimethylsilatrane) |
| BIOCTS: | 1,8-bis(3,7,10-trimethyl-2,8,9-trioxa-5-aza-1-silabicyclo[3.3.3]undecan-1-yl)octane, or 1,8-bis(3,7,10-trimethylsilatrane)octane |
| DMASTI: | N,N-dimethyl-3-(3,7,10-trimethyl-2,8,9-trioxa-5-aza-1-silabicyclo[3.3.3]undecan-1-yl)propan-1-amine |
| PYSTI: | 3,7,10-trimethyl-1-(3-(pyrrolidin-1-yl)propyl)-2,8,9-trioxa-5-aza-1-silabicyclo[3.3.3]undecane |
| BIMSTI: | N-benzylidene-3-(3,7,10-trimethyl-2,8,9-trioxa-5-aza-1-silabicyclo[3.3.3]undecan-1-yl)propan-1-amine |
| ETTS: | 1-ethoxy-2,8,9-trithia-5-aza-1-silabicyclo[3.3.3]undecane; or 1-ethoxy-thiosilitrane |
| ETAS: | 1-ethoxy-2,8,9-trimethyl-2,5,8,9-tetraaza-1-silabicyclo[3.3.3]undecane; or 1-ethoxy-2,8,9-triazasilatrane |
| EPTI: | 3,7,10-trimethyl-1-(3-(oxiran-2-ylmethoxy)propyl)-2,8,9-trioxa-5-aza-1-silabicyclo[3.3.3]undecane; or 1-(3-(oxiran-2-ylmethoxy)propyl)-3,7,10-trimethylsilatrane |

The functionalized polymer may be compounded into a rubber composition.

The rubber composition may optionally include, in addition to the functionalized polymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society,* Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. No. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this example, synthesis of the terminator EPTI is illustrated.

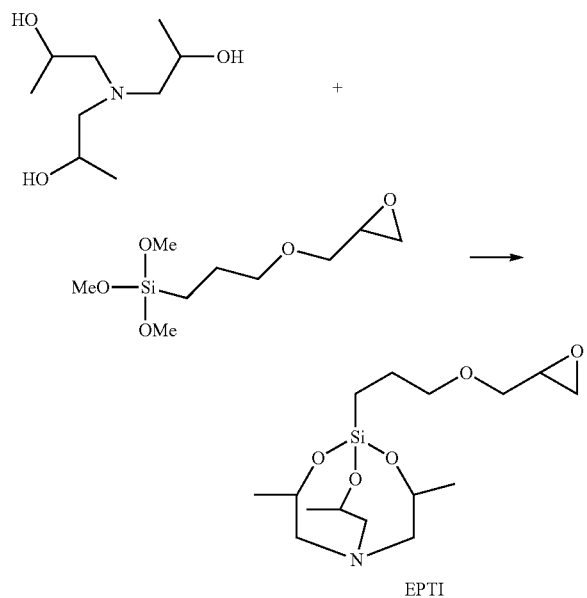

EPTI

Triisopropanolamine (105.0 g), 3-Glycidoxypropyltrimethoxysilane (132.3 g) and potassium hydroxide (0.92 g) were mixed in a 1-liter 3-neck round bottle flask equipped with distillation apparatus. The mixture was then heated to 90° C. by heating mantle, and methanol produced from the reaction was removed under reduced pressure of 250 mmHg. After 2 hour of reaction the pressure was reduced to 150 mmHg for 1 hour, then 100 mmHg for another hour. Total of 66 mL of ethanol was recovered from the distillation. Total of 172 g (94% yield) of pale yellow viscous liquid, 3,7,10-trimethyl-1-(3-(oxiran-2-ylmethoxy)propyl)-2,8,9-trioxa-5-aza-1-silabicyclo[3.3.3]undecane; or 1-(3-(oxiran-2-ylmethoxy)propyl)-3,7,10-trimethylsilatrane (EPTI), was obtained. $^1$HNMR and $^{13}$CNMR spectroscopy analysis has shown larger than 95% purity of the desired product.

Example 2

In this example, the preparation of functionalized and non-functionalized polybutadiene with a neodymium catalyst is illustrated.

Polybutadiene cement was produced in a continuous reactor chain that was comprised of two 5 gallon reactors. A 15 weight percent butadiene/hexane solution and a 0.02 M preformed catalyst solution were continuously fed to the reactor chain at a catalyst loading of 0.12 mmol catalyst per hundred grams monomer. The catalyst was comprised of neodymium versatate, triisobutyl aluminum, butadiene and diethyl aluminum chloride and hexane at mole ratios Nd:Al:butadiene:Cl=1:25:40:2.5.

Non-functional polymer was prepared by adding 50 mL of isopropanol and 50 mL of water to a 1-gallon sample of polymer cement and mixing for 1 h. Antioxidant (0.2 phr of Polystay K) was added and the polymer was isolated by steam stripping followed by oven drying. The polymer was determined to have a Mn of 157,200 and a PDI of 1.9.

Functional polymer was prepared by the addition of a toluene solution of EPTI (2.7 phr) to a 1-gallon sample of polymer cement and mixing for 24 h. 50 mL each of water and isopropanol were added and mixed thoroughly, followed by 0.2 phr of Polystay K. The polymer was isolated by steam stripping followed by oven drying. The polymer was determined to have a Mn of 219,100 and a PDI of 1.7.

The polymers obtained were characterized using different techniques, for example, size exclusion chromatography (SEC) for determination of molecular weight, IR for determining cis, trans, styrene and vinyl content, and Mooney viscosity measurements (ML1+4 at 100 C) with results given in Table 2.

TABLE 2

| Polymer Sample | Mooney | Cis | Trans | Vinyl |
| --- | --- | --- | --- | --- |
| Nd-PBD-EPTI (EPTI Functionalized PBD) | 39.6 | 93.8 | 5.5 | 0.7 |
| Nd-PBD (Non-Functionalized PDB) | 27.4 | 93.5 | 5.8 | 0.7 |

Example 3

The EPTI-functionalized and non-functionalized polybutadienes of Example 2 (Samples 1 and 2) as well as control (Sample 3) and a comparative neodymium catalyzed polybutadiene (Sample 4) were used to make rubber compounds.

Rubber compounds were mixed in a 3-piece 360 mL CW Brabender® mixer equipped with Banbury® rotor. Each SBR sample was mixed with additives in a three stage mix procedure as shown in Table 3, with all amounts given in parts by weight, per 100 parts by weight of elastomer (phr). In the first non-productive mix stage, compounds were mixed for 4 minutes at 100 rpm using 120° C. as starting temperature. All compounds were milled to a thick sheet before a productive mix stage. Productive mixes were carried out using 60° C. starting temperature and 60 rpm with mix time of 3 minute.

Figure 2:
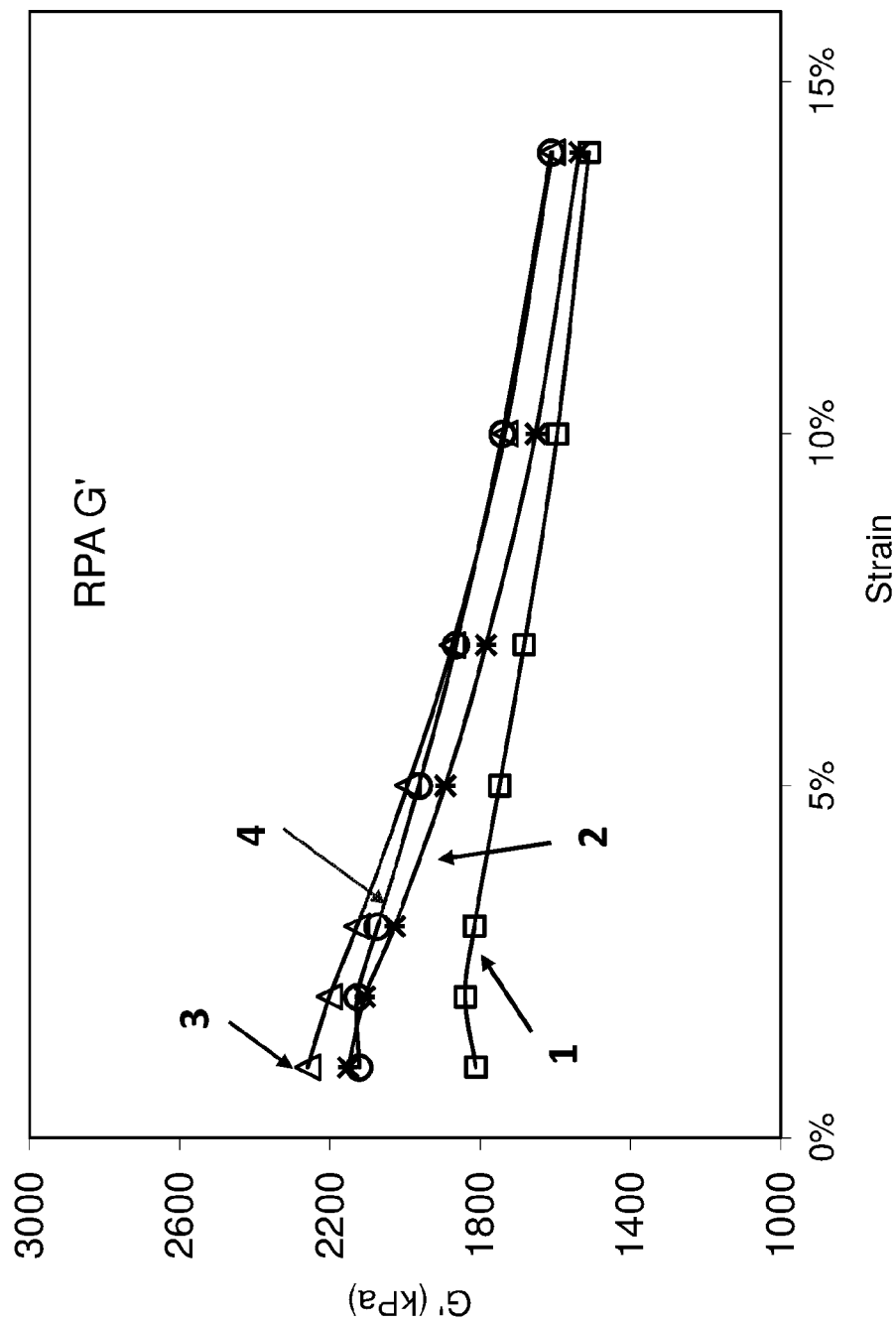
FIG. 2 shows a graph of G' versus percent strain for several rubber samples.
Figure 3:
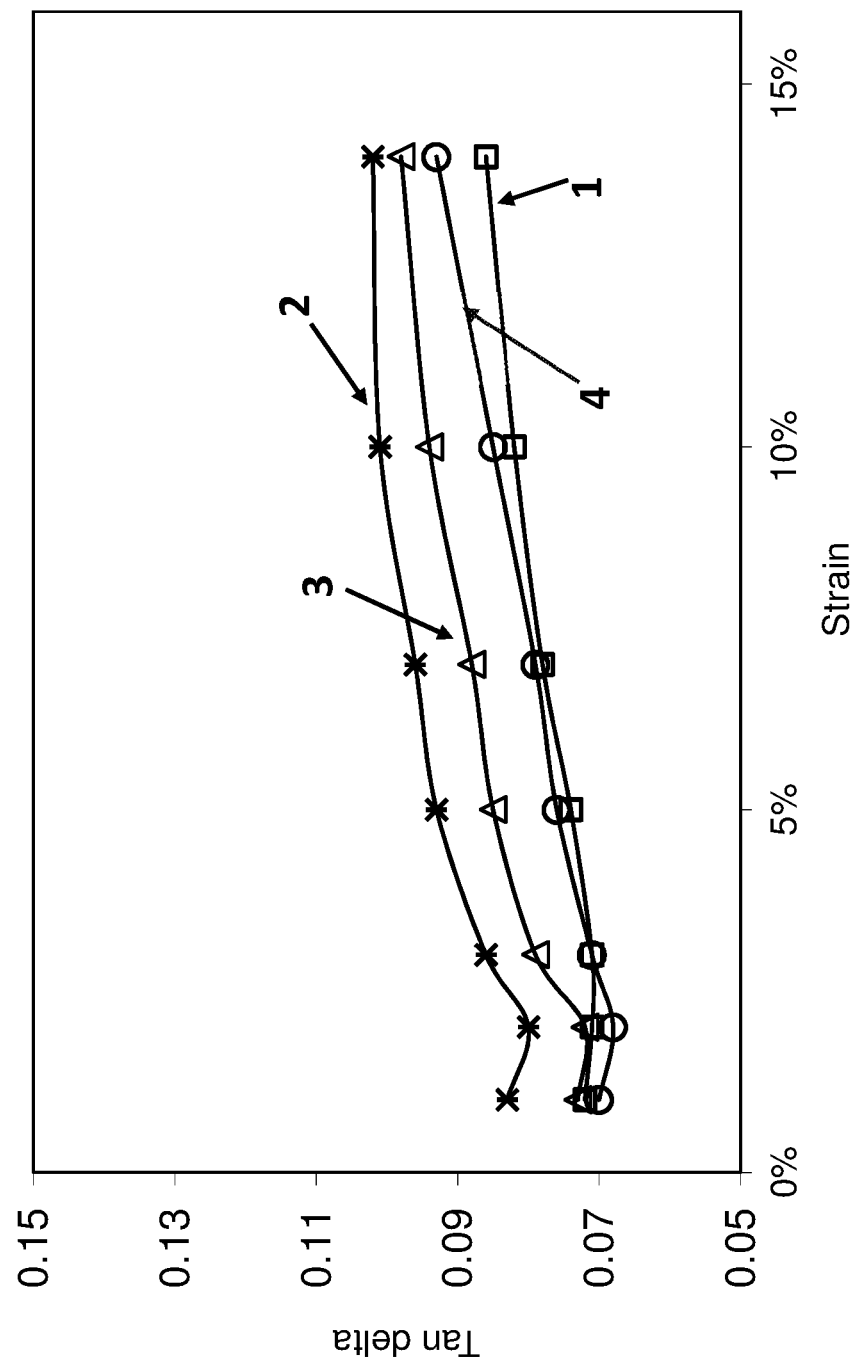
FIG. 3 shows a graph of tan delta versus percent strain for several rubber samples.

The compounds were tested for rheology properties using an RPA 2000® from Alpha Technology. Productive compounds were first heated to 100° C. and the storage modulus was measured at a frequency of 0.83 Hz and 15% strain in order to determine the processability of the compounds. Subsequently the compounds were cured at 160° C. for 16 minute at the lowest possible strain (0.7%) to mimic a static cure. Then the compounds were cooled to 100 C, and a subsequent strain sweep is performed. Results are shown in FIGS. 1 to 3.

TABLE 3

| Sample No. | 1 | 2 | 3 | 4 |
|---|---|---|---|---|
| Type | inventive | control | comparative | control |
| SBR | 40 | 40 | 40 | 40 |
| Nd-PBD-EPTI[1] | 60 | 0 | 0 | 0 |
| Nd-PBD[2] | 0 | 60 | 0 | 0 |
| Ni-PBD[3] | 0 | 0 | 60 | 0 |
| Nd-PBD-LX[4] | 0 | 0 | 0 | 60 |
| Silica | 50 | 50 | 50 | 50 |
| Oil | 14 | 14 | 14 | 14 |
| Silane | 4 | 4 | 4 | 4 |
| Antioxidant | 2 | 2 | 2 | 2 |
| Sulfur | 1.6 | 1.6 | 1.6 | 1.6 |
| Accelerators | 2.85 | 2.85 | 2.85 | 2.85 |
| Zn oxide | 2 | 2 | 2 | 2 |

[1]EPTI functionalized, Nd-catalyzed polybutadiene of Example 2
[2]Nonfunctionalized, Nd-catalyzed polybutadiene of Example 2
[3]Nonfunctionalized Ni-catalyized polybutadiene, as Budene 1207 from The Goodyear Tire & Rubber Co.
[4]Nonfunctionalized, Nd-catalyzed polybutadiene as CB25 from Lanxess As seen in FIG. 1, MDR curves show that samples 1 to 4 were vulcanized in a similar rate, which indicates that the silatrane functional groups of the functionalized polymer (Sample 1) do not notably interfere with the vulcanization process compared to non-functionalized control (Sample 2).

The storage modulus, RPA G' curves in FIG. 2 indicate an increase in polymer filler interaction for samples containing silatrane functional groups (sample 1), compared to non-functionalized control, sample 2. Such increased polymer filler interaction is shown as reduced Payne effect. The Payne effect is the nonlinear dynamic mechanical property of elastomers in the presence of filler first studied by Payne, Appl. Polym. Sci., 6, 57 (1962). Generally it is associated with the breakdown and agglomeration of filler particles. In the presence functionalized elastomer, the interaction of polar functional groups and filler particles, e.g. silica, facilitates the filler network breakdown, which may lead to better filler dispersion. Tan delta curves (FIG. 3) have shown lower values for samples containing functionalized polymer disclosed herein (sample 1), compared to non-functionalized control, sample 2. Lower tan delta may also indicate better polymer filler interaction, as well as better silica dispersion.

While certain representative embodiments and details have been shown for the purpose of illustrating the subject invention, it will be apparent to those skilled in this art that various changes and modifications can be made therein without departing from the scope of the subject invention.

What is claimed is:

1. A functionalized elastomer comprising the reaction product of a living elastomeric polymer and a polymerization terminator of formula I, wherein the functionalized elastomer comprises repeat units of a diene monomer and optionally a vinyl aromatic monomer, and the functionalized elastomer comprises at least 92 percent by weight of cis 1,4 microstructure content based on the weight of the polydiene content of the functionalized elastomer

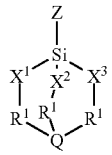
(I)

wherein $R^1$ is C1 to C4 linear alkyl, or C1 to C4 branched alkanediyl; $X^1$, $X^2$, $X^3$ are independently O, S, or a group of formula (II) or (III)

(II)

(III)

where $R^2$ is C1 to C18 linear or branched alkyl; Z is $R^3$, —$OR^4$, or —$R^5$—$X^4$; $R^3$, $R^4$ are independently C1 to C18 linear or branched alkyl; $R^5$ is C1 to C18 alkanediyl or dialkyl ether diyl; $X^4$ is halogen or a group of structure IV, V, VI, VII or VIII

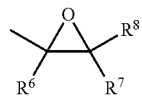
(IV)

(V)

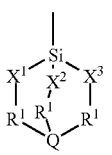

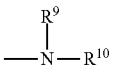
(VI)

(VII)

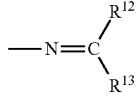
(VIII)

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl;

Q is N or a group of structure IX

wherein $R^{14}$ is C1 to C8 alkyl.

2. The functionalized elastomer of claim 1, wherein the living elastomer is derived from at least one of isoprene and butadiene, and optionally from styrene.

3. The functionalized elastomer of claim 1, wherein the living elastomer is derived from butadiene.

4. The functionalized elastomer of claim 1, wherein the living elastomer is derived from butadiene and styrene.

5. The functionalized elastomer of claim 1, wherein the polymerization terminator of formula I is selected from the group consisting of the following structures

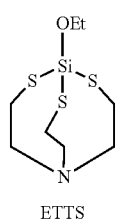 [SMILES: CCO[Si]12SCCN(CCS1)CCS2]

ETTS

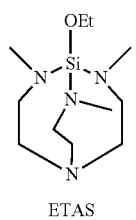

ETAS

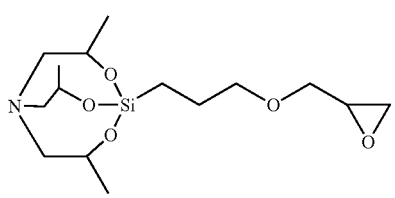

EPTI

ETTS: 1-ethoxy-2,8,9-trithia-5-aza-1-silabicyclo[3.3.3]undecane; or 1-ethoxy-thiosilatrane ETAS: 1-ethoxy-2,8,9-trimethyl-2,5,8,9-tetraaza-1-silabicyclo[3.3.3]undecane; or 1-ethoxy-2,8,9-triazasilatrane EPTI: 3,7,10-trimethyl-1-(3-(oxiran-2-ylmethoxy)propyl)-2,8,9-trioxa-5-aza-1-silabicyclo[3.3.3]undecane; or 1-(3-(oxiran-2-ylmethoxy)propyl)-3,7,10-trimethyl-silatrane.

6. The functionalized elastomer of claim 1, wherein the functionalized elastomer comprises at least 95 percent by weight of cis 1,4 microstructure content based on the weight of the polydiene content of the functionalized elastomer.

7. The functionalized elastomer of claim 1, wherein the functionalized elastomer comprises at least 98 percent by weight of cis 1,4 microstructure content based on the weight of the polydiene content of the functionalized elastomer.

8. A rubber composition comprising the functionalized elastomer of claim 1.

9. The rubber composition of claim 8, further comprising silica.

10. A pneumatic tire comprising the rubber composition of claim 9.

11. A method of making a functionalized elastomer, comprising the steps of polymerizing monomers comprising a diene monomer and optionally a vinyl aromatic monomer in the presence of a lanthanide-based coordination polymerization catalyst, and terminating the polymerization with a terminator of formula I

wherein $R^1$ is C1 to C4 linear alkyl, or C1 to C4 branched alkanediyl; $X^1$, $X^2$, $X^3$ are independently O, S, or a group of formula (II) or (III)

where $R^2$ is C1 to C18 linear or branched alkyl; Z is $R^3$, —$OR^4$, or —$R^5$—$X^4$; $R^3$, $R^4$ are independently C1 to C18 linear or branched alkyl; $R^5$ is C1 to C18 alkanediyl or dialkyl ether diyl; $X^4$ is halogen or a group of structure IV, V, VI, VII or VIII

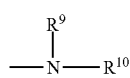
(VI)

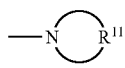
(VII)

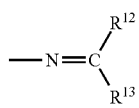
(VIII)

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl;

Q is N or a group of structure IX

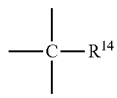
(IX)

wherein $R^{14}$ is C1 to C8 alkyl, wherein the functionalized elastomer comprises at least 92 percent by weight of cis 1,4 micro structure content based on the weight of the polydiene content of the functionalized elastomer.

12. The method of claim 11, wherein the lanthanide-based coordination polymerization catalyst is a neodymium based catalyst.

13. The method of claim 11, wherein the monomers comprise at least one of isoprene and butadiene, and optionally from styrene.

14. The method of claim 11, wherein the monomer is butadiene.

15. The method of claim 11, wherein the monomers are butadiene and styrene.

16. The method of claim 11, wherein the terminator of formula I is selected from the group consisting of the following structures

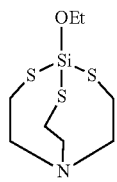
ETTS

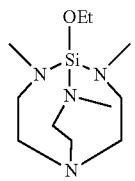
ETAS

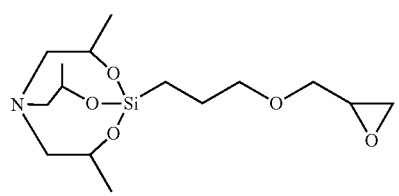
EPTI

ETTS: 1-ethoxy-2,8,9-trithia-5-aza-1-silabicyclo[3.3.3]undecane; or 1-ethoxy-thiosilitrane ETAS: 1-ethoxy-2,8,9-trimethyl-2,5,8,9-tetraaza-1-silabicyclo[3.3.3]undecane; or 1-ethoxy-2,8,9-triazasilatrane EPTI: 3,7,10-trimethyl-1-(3-(oxiran-2-ylmethoxy)propyl)-2,8,9-trioxa-5-aza-1-silabicyclo[3.3.3]undecane; or 1-(3-(oxiran-2-ylmethoxy)propyl)-3,7,10-trimethylsilatrane.

17. The method of claim 11, wherein the functionalized elastomer comprises at least 95 percent by weight of cis 1,4 microstructure content based on the weight of the polydiene content of the functionalized elastomer.

18. The method of claim 11, wherein the functionalized elastomer comprises at least 98 percent by weight of cis 1,4 microstructure content based on the weight of the polydiene content of the functionalized elastomer.

* * * * *